United States Patent [19]

Cook et al.

[11] Patent Number: 5,418,456
[45] Date of Patent: May 23, 1995

[54] MONITORING PILGER FORMING OPERATION BY SENSING PERIODIC LATERAL DISPLACEMENT OF WORKPIECE

[75] Inventors: Charles S. Cook, Pittsburgh; Edward S. Diaz, Monroeville, both of Pa.

[73] Assignee: Westinghouse Electric Corporation, Pittsburgh, Pa.

[21] Appl. No.: 900,709

[22] Filed: Jun. 17, 1992

[51] Int. Cl.$^6$ .............................................. G07B 7/287
[52] U.S. Cl. ............................ 324/207.23; 324/207.18; 324/227
[58] Field of Search ...................... 324/207.16, 207.18, 324/207.23, 207.26, 232, 226, 227, 234–243

[56] References Cited

U.S. PATENT DOCUMENTS

| | | |
|---|---|---|
| 3,948,070 | 4/1976 | Hentzschel et al. . |
| 4,038,848 | 8/1977 | Ichiryn et al. . |
| 4,044,580 | 8/1977 | Worden et al. . |
| 4,054,043 | 10/1977 | Eibe . |
| 4,059,794 | 11/1977 | Furnes et al. . |
| 4,100,786 | 7/1978 | Dorp et al. . |
| 4,233,834 | 11/1980 | Matinlassi . |
| 4,562,713 | 1/1986 | Kondoh . |
| 4,608,534 | 8/1986 | Cecco et al. ............. 324/238 |
| 4,641,092 | 2/1987 | Sakamoto et al. ......... 324/236 X |
| 4,674,312 | 6/1987 | Cook . |
| 4,687,992 | 8/1987 | von Bernus et al. ............. 324/232 |
| 4,765,174 | 8/1988 | Cook et al. . |
| 4,819,471 | 4/1989 | Cook . |
| 4,843,854 | 4/1989 | Ackerly . |
| 4,955,220 | 9/1990 | Duerring . |
| 4,990,305 | 2/1991 | Foster et al. . |
| 5,066,913 | 11/1991 | Catanese ............. 324/239 X |
| 5,076,088 | 12/1991 | Klingen et al. . |
| 5,101,366 | 3/1992 | Cueman et al. ............. 324/238 X |
| 5,175,498 | 12/1992 | Cueman et al. ............. 324/238 X |

Primary Examiner—Sandra L. O'Shea
Assistant Examiner—Warren S. Edmonds

[57] ABSTRACT

A production measuring system is provided for early identification of dimensional or operational problems in a pilger forming device. The forming device has a mandrel for supporting a tubular workpiece to be elongated and thinned, at least two opposed dies bearing against the workpiece, and a mechanical drive for rolling the dies over the workpiece under pressure while periodically rotating and advancing the workpiece along the mandrel. Sensors are directed at the workpiece and produce signals reflecting displacement of the workpiece in rotation, axial displacement and transverse displacement. The signals can be compared to nominal standards and/or graphed and displayed, for visualizing operational conditions. The sensors can be disposed axially before or after the dies, or both. Preferably, idler rollers coupled to rotary variable differential transformers encode axial and rotational displacement after the dies (on the formed workpiece), and a pair of non-contacting proximity sensors disposed at right angles encode transverse displacement of the workpiece before the dies.

20 Claims, 7 Drawing Sheets

MONITORING PILGER FORMING OPERATION BY SENSING PERIODIC LATERAL DISPLACEMENT OF WORKPIECE

BACKGROUND OF THE INVENTION

1. Field of the Invention

This invention relates to a method and apparatus for monitoring the position of a workpiece tube in a pilger forming operation over time, and in particular to a device which monitors axial, rotational and transverse displacement of the tube, to enable detection of set-up problems, lubrication deficiencies and process variations indicating a predisposition to wear of the pilger forming apparatus and/or the results of wear which already has occurred.

2. Prior Art

A pilger mill is a forming apparatus for axially elongating and reducing the diameter of a ductile tube. A pair of opposed rollers or dies bear on the tube over a forming area covering an axial length, and have tapering grooves around a portion of their circumference. The dies are rolled over the tube or workpiece in the forming area to incrementally reduce the tube diameter while the tube is supported on a mandrel. The dies reduce the external diameter, and in conjunction with the mandrel elongate the tube axially while thinning the tube walls. The dies are operated in a cyclic manner. With each stroke the tube is advanced along its longitudinal axis and rotated.

Pilger forming is used in the production of precision tubing such as zirconium alloy tube as used in cladding nuclear fuel. This process involves rolling the tube over a tapered mandrel between two semi-circular grooves machined in the periphery of two opposed dies to form a very thin walled tube to precise dimensions. The input tube or workpiece is incrementally fed along its axis and rotated with the tapered mandrel between each work stroke and return stroke of the dies. The machine operates at up to about 250 work and return stoke cycles per minute, and produces in excess of 80% area reduction in the tubular work piece. Some examples of pilger forming for zirconium alloy tubes are disclosed in U.S. Pat. Nos. 4,233,834 - Matinlassi; 4,674,312 - Cook; 4,765,174 - Cook et al; 4,819,471 - Cook; and 4,990,305 - Foster et al.

Because of the precise dimensional tolerances required particularly in the zirconium alloy product and the high cost of the equipment and tooling, it is important to identify as early as possible any conditions that could lead either to deterioration of the equipment or to the production of unacceptable product. Some conditions which produce unacceptable product are poor lubrication, tooling misalignment and excessive equipment wear. It may be possible to detect some of these conditions by quality control measurement steps conducted on finished product. However, conditions which cause wear or produce unacceptable product cause irretrievable damage to workpieces in progress and/or to the forming apparatus.

It is known to instrument rolling mills in connection with controlling the motion of the rolls or dies. Such apparatus are disclosed, for example, in U.S. Pat. Nos. 3,948,070 - Hentzschel et al; and 4,038,848 - Ichiryu et al. Instrumentation can also be used to identify misalignment of the rolls and improper roll gap, using sensors which engage with the rolls or the drive shafts on which the rolls are mounted. Examples are disclosed in U.S. Pat. Nos. 4,044,580 - Worden et al; and 4,059,794 - Furness et al. However, whereas some defects in operational status of the rolls may occur when the rolls are properly aligned a better and more direct way to identify problems would be advantageous.

In various production processes, a variety of measurements are taken during the progress of particular pieces through the production steps. Upon completion of production, process engineers and the like attempt to correlate attributes of the finished product with measurements taken during production. This enables identification of the particular process parameters which affect the attributes of the finished product. For example, via quality assurance measurements it may be discovered that a particular run of formed product is characterized by undue bowing, eccentricity of the lumen of the formed tube or the like. These attributes may be correlated with the use of particular forming equipment such as dies which are worn or improperly set up. However, correlating the finished product with previous production steps obviously fails to correct problems until a quantity of defective product already has been produced. An earlier and more direct means to identify problems in finished workpieces is needed, preferably a means which can identify a problem even as to a workpiece in the progress of being formed.

The present invention provides a system whereby the attributes of the workpiece are measured to identify problems as they occur. The invention thus provides a means for directly sensing product attributes in a manner that reflects either or both of problems in the forming apparatus and the product which is formed.

The invention in particular provides a means for acquiring and displaying data respecting the transverse displacement of a workpiece in successive forming cycles of the dies in a pilger forming process. By displaying the displacement with respect to mutually perpendicular axes, it is possible to visualize the extent to which the workpiece is experiencing unequal lateral forces, which are characteristic of problems which result in undue wear or unacceptable finished product dimensions. This capability is preferably provided on-line and substantially in real time during the forming process.

SUMMARY OF THE INVENTION

It is an object of the invention to identify problems in a pilger forming operation as early as possible, so as to minimize damage to the forming equipment and the production of unacceptable product.

It is another object of the invention to make as direct a measurement of the attributes of the formed product as possible, during the forming operation, as a means to identify promptly any process parameters that may produce unacceptable product or undue wear.

It is a further object of the invention to provide a process monitoring apparatus operable to display visually the transverse displacement of a workpiece in a pilger forming apparatus relative to a nominal forming axis, so as to provide immediate feedback to the operator of unequal forces being applied to the workpiece during forming.

These and other objects are accomplished by a production measuring system for early identification of dimensional or operational problems in a pilger forming device. The forming device has a mandrel for supporting a tubular workpiece to be elongated and thinned, at least two opposed dies bearing against the workpiece, and a mechanical drive for rolling the dies over the workpiece under pressure while periodically rotating and advancing the workpiece along the mandrel. Sensors are directed at the workpiece and produce signals reflecting displacement of the workpiece in rotation, axial displacement and transverse displacement. The signals can be compared to nominal standards and/or graphed and displayed, for visualizing operational conditions. The sensors can be disposed axially before and after the forming zone relative to the direction of axial workpiece feed and elongation. Preferably, idler rollers coupled to rotary variable differential transformers encode axial and rotational displacement at a point after the dies (i.e., on the formed portion of the workpiece), and a pair of inductive displacement sensors are disposed at right angles to encode transverse displacement of the workpiece at a point before the forming zone.

BRIEF DESCRIPTION OF THE DRAWINGS

There are shown in the drawings exemplary embodiments of the invention as presently preferred. It should be understood that the invention is not limited to the precise arrangements and instrumentalities shown and discussed, and is capable of variation in accordance with the scope of the appended claims and their reasonable equivalents. In the drawings.

DETAILED DESCRIPTION OF THE PREFERRED EMBODIMENTS

Figure 1:
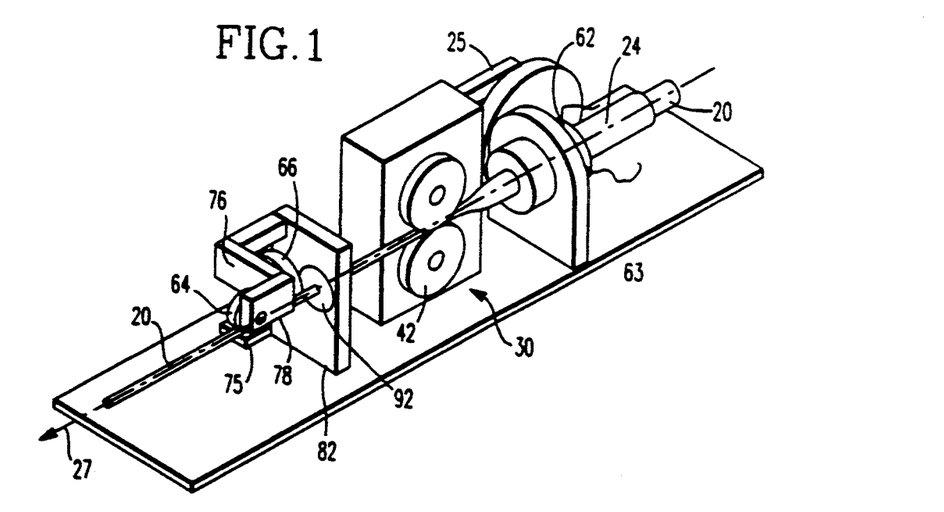
FIG. 1 is a partial perspective view showing the elements of a pilger forming apparatus according to the invention.

The invention permits monitoring of a pilger forming operation while in progress. In a preferred application the invention is used for monitoring displacement of a workpiece comprising a zirconium alloy tube, during cold pilgering for the production of nuclear fuel cladding. An otherwise conventional pilger forming mill as shown in FIG. 1 is instrumented according to the invention for the acquisition of data representing motion or displacement of the workpiece. Displacement is measured at least transversely, in a plane perpendicular to the direction of feeding and elongation, and preferably in all three principal directions, namely axial, transverse and rotational. Selected data obtained in this manner can be analyzed with respect to nominal standards, for example of maximum and/or minimum displacement expected during a forming stroke, and also can be graphed to enable ready visualization of the process parameters affecting the quality of the finished product as well as the operational status of the forming apparatus.

The invention is described with respect to pilgering of zirconium alloy tubing. It should be appreciated that the invention is likewise applicable to similar processes relating go forming cycles in ductile materials, especially as in pilgering, where the deviation of the workpiece from a nominal axis may occur when variations in lubrication, uneven die wear and other parameters may cause the exertion of forces which are not aligned to the nominal forming axis, as well as variation in the relationship of forces applied (and relative displacements which result) to the workpiece in axial, rotational and transverse directions.

Figure 2:
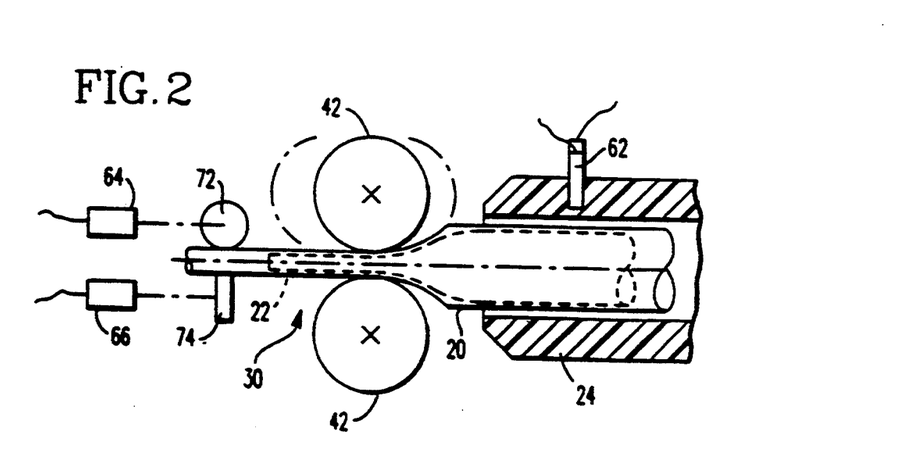
FIG. 2 is a schematic block diagram corresponding to FIG. 1 and showing the forming and sensing elements according to the invention.
Figure 3:
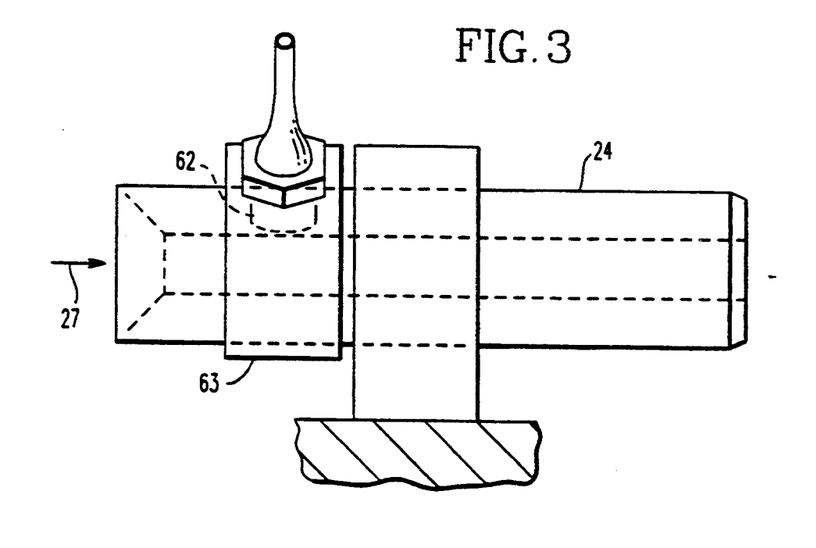
FIG. 3 is a side elevation view showing the transverse displacement sensor.
Figure 4:
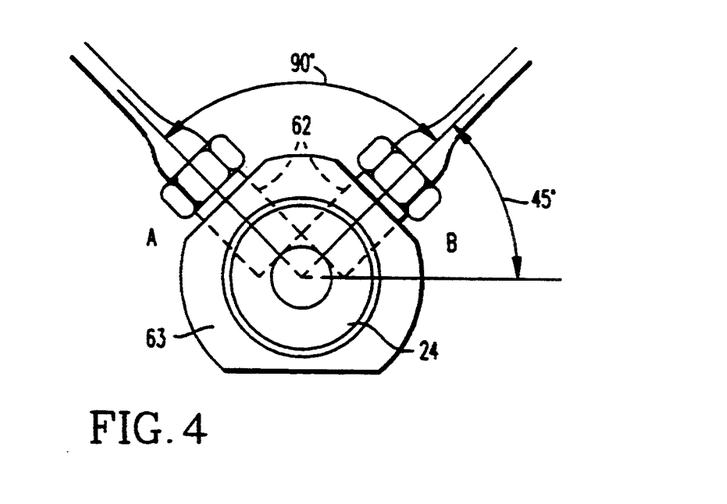
FIG. 4 is an end elevation of the transverse displacement sensor mounting according to FIG. 2.

Referring to FIGS. 1 and 2, the workpiece 20 is supported at a position before the forming zone 30 along the direction of axial feed and elongation is a guide sleeve 24, for example a urethane guide sleeve permitting slight displacement of the unformed length of tube therein. A mandrel 22 having a tapered outer surface in the area of the forming zone 30 also supports the tube 20 from inside. The two dies 42, each of which has a tapering peripheral groove, are applied to the tube 20 at the forming zone and are rolled over the tube along the axial extension of the forming zone, in repetitive cycles. With each cycle, the walls of the tube are thinned by pressure between the dies 42 and the mandrel 22, causing the tube to become axially elongated, together with thinning of the tube walls. Appropriate means for driving the dies in a pilger process are well known, including for example a crank mechanism 25 operable to reciprocate a mounting block holding the dies 42. Accordingly, the drive means are shown only generally in FIG. 1.

The tubular workpiece 20 can be advanced axially and rotated at the beginning of each stroke of the dies 42, which area passed through a work stroke and a return stroke. Other variations in pilger operation include feeding and turning at the end of the work stroke, and feeding and turning constantly with time over the entire operation. According to the invention, the transverse position of the workpiece 20 is monitored by sensors operable to encode the position of the workpiece in a plane perpendicular to the feed/elongation direction 27. Preferably, the transverse position of the unformed portion of the workpiece, supported with some minimal clearance in the guide sleeve 24, is monitored using two non-contact inductive displacement sensors 62. The sensors 62 can be mounted in bores in the guide sleeve 24 before the forming zone (i.e., preceding the dies 42 in the feed direction 27). The transverse position sensors 62 and the mounting therefor are shown in FIGS. 1–4. The sensors 62 can be placed directly in the guide sleeve 24, as shown in the schematic illustration of FIG. 2. Preferably, however, the guide sleeve 24 is made of a yieldable material such as urethane, and the sensors are mounted in a collar 63, which is clamped onto guide sleeve 24 or a support therefor.

The axial motion of the workpiece is monitored via an axial motion sensor 64, placed after the forming zone, being thereby operable to detect axial displacement resulting from elongation of the workpiece 20 as well as feeding. The rotation of the workpiece is monitored using a rotational motion sensor 66, also after the forming zone. The axial and rotational motion (or displacement) sensors, as shown in detail in FIGS. 5 and 6, comprise idler wheels 72, 74, which bear against the surface of workpiece 20, coupled to means for metering rotation of the idler wheels.

Axial movement is normal in pilgering since the tube 20 is axially fed and elongated with each cycle of the mill (i.e., with the work and return strokes of the die set). Difficulties may occur with feeding, for example due to the workpiece 20 sticking to the mandrel 22. Such difficulties are detectable according to the invention, during the forming process.

Rotational motion is also normal to pilgering, the workpiece 20 and the mandrel 22 typically being incrementally rotated at the beginning of each cycle. Unexpected or abnormal rotation, also detectable using the invention, may indicate a problem with timing, alignment or wear.

Figure 5:
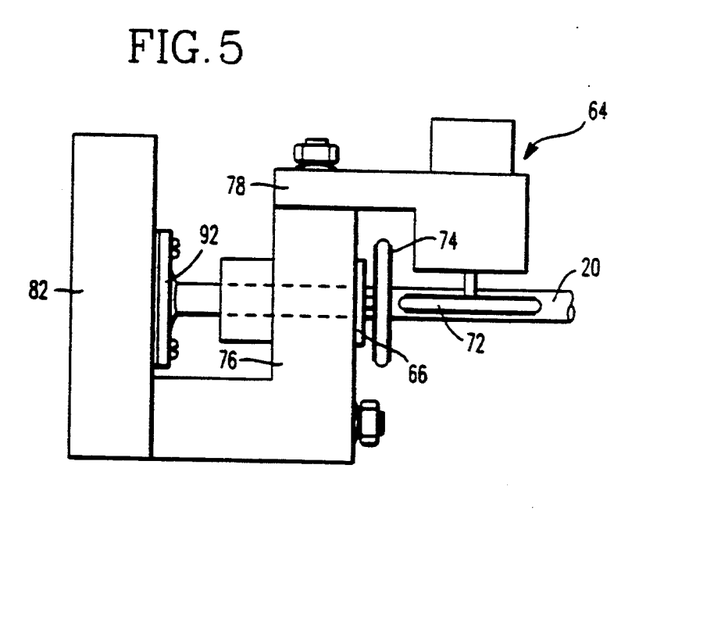
FIG. 5 is a top plan view of a mounting for axial and rotational displacement sensors according to the invention.
Figure 6:
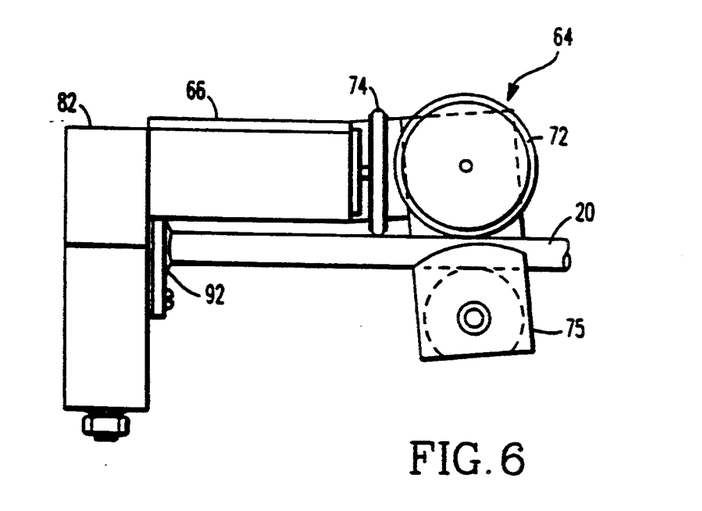
FIG. 6 is a side elevation view of the mounting according to FIG. 4.

Referring to FIGS. 5 and 6, axial and rotational displacement of the workpiece is detected by sensors 64, 66, after the forming zone. The sensors can be based on rotary variable differential transformers (RVDTs), having metering wheels 72, 74 mounted on the respective RVDT shaft and applied to the workpiece exiting the forming zone. Wheels 72, 74 are aligned to rotate on perpendicular axes, one for axial displacement and one for rotational displacement, and preferably are provided with friction rims of rubber or the like, for maintaining good contact with the workpiece as needed to accurately reflect workpiece displacement. However, axial displacement causes the workpiece to slide under the rotational metering wheel without rotating it, and vice versa.

RVDTs produce a triangular output signal as a function of rotation of their shafts over a predetermined angular span, and can be geared or used with an appropriate diameter for wheels 72, 74, to provide the precision needed for a particular application. By way of example, two Pickering Model 23330 RVDTs can be used for sensors 62, 64, with the metering wheels 72, 74 dimensioned so that a number of cycles occur over the linear portion of the RVDT's angular span.

As shown in FIG. 5, the RVDTs can be mounted on pivotable arms 76, 78, whereby the weight of the arms, including the RVDTs and the wheels 72, 74, urges the wheels into contact with the workpiece 20. The arms 76 can be mounted via bolts passed through spring washers as shown in FIGS. 5 and 6. Preferably, the axial and rotational sensors 62, 64 are mounted on a common support 82 at the outlet from the forming zone. The support 82 also can carry a resilient diaphragm 92, having a circular opening dimensioned to stretch over the exiting workpiece 20 and thereby squeegee any lubricant from the workpiece to reduce slippage of the metering wheels 72, 74. Additional means for wiping the workpiece to remove lubricant can be used instead of or in addition to the squeegee diaphragm 92.

The axial metering wheel 72 can be further supported relative to the workpiece, e.g., using an opposed idler wheel or teflon guide channel 75 as shown in FIG. 6. The channel 75 is commonly mounted with the axial RVDT and has spaced walls which ride along the sides of the workpiece, thereby keeping the axial metering wheel 72 centered over the axis of the workpiece 20 against the tendency to ride off laterally to the side. The overall mounting arrangement for the axial and rotational displacement sensors can be clamped or bolted to the pilgering apparatus at the exit of the formed tube.

Other forms of displacement sensors are also possible. By way of example, a shaft angle encoder producing a digital or pulse output can be coupled to an idler wheel arrangement in a manner similar to that discussed for the RVDT embodiment disclosed as an example. The shaft angle encoder can also be mechanically geared to provide the necessary precision.

Transverse displacement is detected, for example, using non-contacting inductive sensors 62 which produce a voltage level output varying with displacement between the workpiece 20 and the respective sensor head. Two sensors 62 aligned perpendicular to one another can produce outputs reflecting the X-Y position of the workpiece in a plane perpendicular to the axis of feeding/elongation. In the embodiment shown, the two sensors are mounted at 45° to vertical (i.e., 90° apart). Appropriate sensors are, for example, Kaman Model 2310-3U displacement transducers, which can resolve displacement to about 30 $\mu$m (or about 12 $\mu$inch).

Transverse forces on the workpiece are undesirable and may indicate a problem with alignment or undue wear. In an ideal case, the workpiece 20, mandrel 22 and dies 42 are all precisely aligned throughout the stroke and return, and all forces on the workpiece are axial or rotational. However, in a real situation, unequal forces are generated which tend to displace the workpiece 20 transversely of the feed axis. Rotation of the workpiece is intended to equalize transverse forces by distributing them around the axis of the workpiece. Nevertheless, such variations may adversely affect the finished product, and even a force which varies equally around the workpiece over successive cycles will cause wear on the mandrel and dies. A significant proportion of pilger mandrels fail due to bending fatigue, which results from application of transverse forces.

The output signals of the respective sensors 62, 64, 66 are analog levels in the disclosed example. The sensor signals can be monitored continuously and plotted, and/or sampled. Sampling at regular time intervals during the forming process in one alternative. Sampling at certain points in the pilgering cycle is also possible. The normal operation of the pilgering mill is characterized by reciprocating strokes, for example at over 200 cycles per minute, and the workpiece 20 is subject to vibration, particularly when not engaged tightly by the grooves in dies 42. It may be sufficient to sample the sensor outputs at a given point in a cycle and at a frequency less than the stroke frequency, however, displacement variations that occur during a stroke may be pertinent and can be monitored by sampling at a rate much higher than the stroke frequency. Sampling may occur over entire cycles or during only certain phases of each cycle such as the work or return strokes, or during feed and turning, for example.

Figure 7:
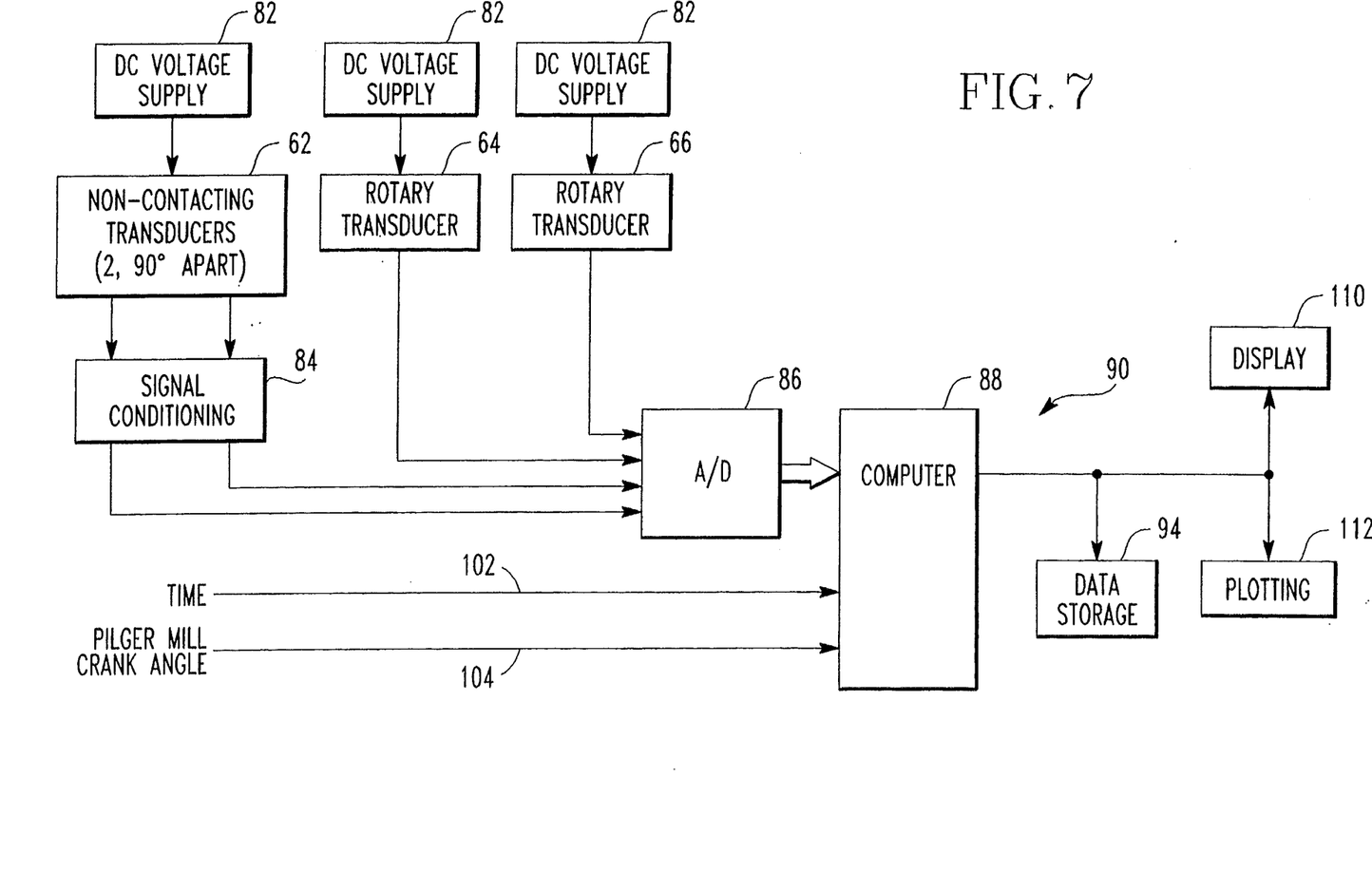
FIG. 7 is a schematic block diagram illustrating the sensor and data acquisition means according to the invention.

FIG. 7 illustrates the coupling of the sensors 62, 64, 66 to a data acquisition system which can be arranged to record the sensor position data and to display it graphically. Each of the sensors is coupled to a regulated reference voltage source 82 (which can be the same), and produces an output signal having a level which varies as a function of sensed displacement in the respective transverse, axial and rotational directions. For sensors which so require, a signal conditioning circuit 84 may be provided, as shown for example, in connection with the inductive sensors 62. It is also possible to include follower amplifiers or line drivers (not shown), for producing a desired signal level at the output and/or for producing impedance conditions which are favorable for the particular sensors.

The output signals are coupled to one or more analog to digital converters 86 operable to encode the data numerically, for example encoding the voltage level to a point within the full span of the respective sensor. The digital data thereby developed is scaled and offset as necessary by a data processor 88 included in the data acquisition system 90, and recorded in memory 94. The data acquisition system can be a general purpose computer data acquisition system such as an IBM PS/2, provided with analog to digital converted inputs and programmed with suitable data acquisition software.

In addition to the signal level inputs, the data acquisition system includes an internal or external clock, shown in the drawing as "time" input 102, enabling repetitive scanning of the sensor outputs. Additionally, an input 104 which indicates a particular pilger mill crank angle is provided to the data acquisition system, and may be coupled as an interrupt or a monitored status input to processor 88, or used to trigger acquisition by A/D converter 86, such that the sensor signal levels can be collected at one or more predetermined points in successive mill strokes. The crank angle input 104 can be a single bit input produced by a limit switch or photocell pair operable to produce a signal pulse at a particular crank angle only, or may be a multiple bit input which represents a readout of crank angles over a 360° span.

The data collected by data acquisition system 90 can be normalized and scaled by processor 88 as required, and used to provide a tabular or graphic display of transverse position, axial displacement and rotation during the forming process. Preferably, the data acquisition system includes a display means 110, and preferably a plotter 112, operable to graphically demonstrate these process parameters. Examples of graphs which can be developed are shown in FIGS. 8–12.

Figure 8:
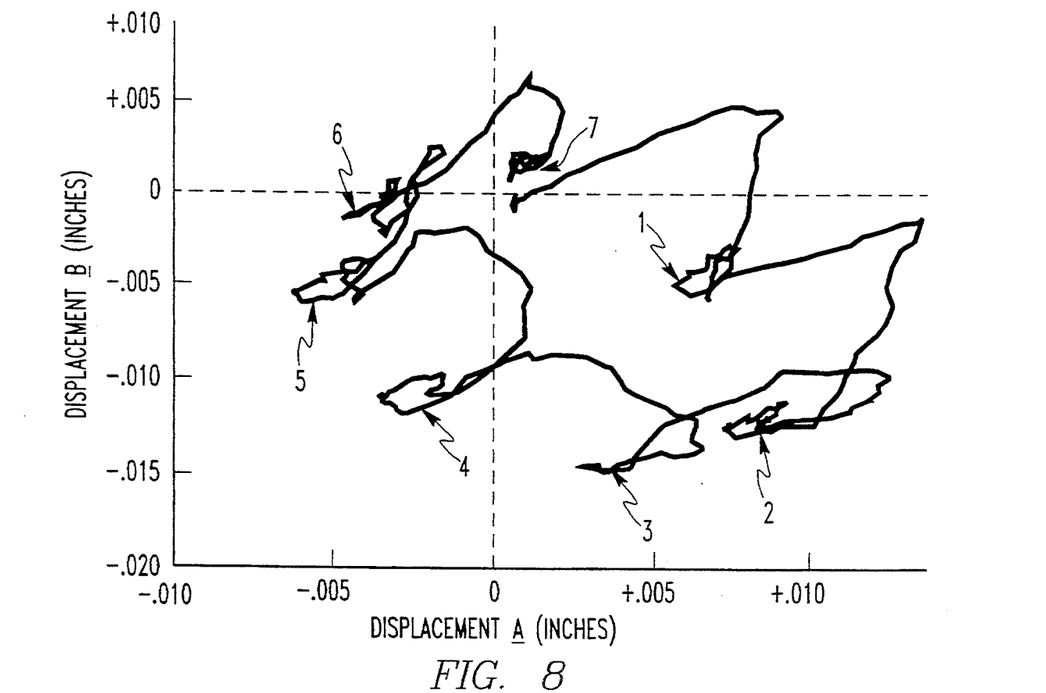
FIG. 8 is a graph of transverse displacement along mutually perpendicular axes during a number of forming cycles.

In FIG. 8, transverse displacement in the two mutually perpendicular axes defined by the orientation of inductive sensors 62 are illustrated over a number of forming cycles. Whereas the sensors 62 are each oriented at 45° to vertical, a true vertical according to the graph would be oriented at 45° to the origin. It is possible to reorient the graticule lines and scales to display the information on a vertically oriented coordinate system by suitable trigonometric conversion using the data acquisition computer 88.

Whereas the workpiece is rotated by a predetermined angle at the beginning of each forming cycle, the graph of transverse displacement typically defines a periodic path as shown in FIG. 8. FIG. 8 demonstrates the variation in transverse displacement through a number of cycles during which the workpiece 20 is rotated through 360°. In the example shown, the path defines a rough oval, with the transverse position of the workpiece 20 during the work stroke appearing as a concentration of samples defining dwell points at those times in the cycle where the dies 42 substantially clamp down on the workpiece 20 and thus damp displacement from the present position. The dwell points for the respective cycles are labelled 1 through 7, showing the changes in transverse displacement in order. It has been discovered that from one forming die setup to another, and with wear of the dies 42, the characteristic pattern of transverse displacement as shown in FIG. 8 varies, and can be used to monitor performance. The characteristic oval may be more or less eccentric, may be inclined relative to vertical in one direction or the other, and may be characterized by larger or smaller excursions from the origin (i.e., larger or smaller displacement in a transverse direction from the nominal axis of the mandrel 22 and workpiece 20). By visually displaying displacement information in the manner shown, the operator can monitor the performance of the forming apparatus and determine, at least from the extent of excursion from the origin, and preferably by noting changes in the pattern, whether problems with the forming apparatus are arising that may produce unacceptable product or damage to the forming equipment.

Figure 9:
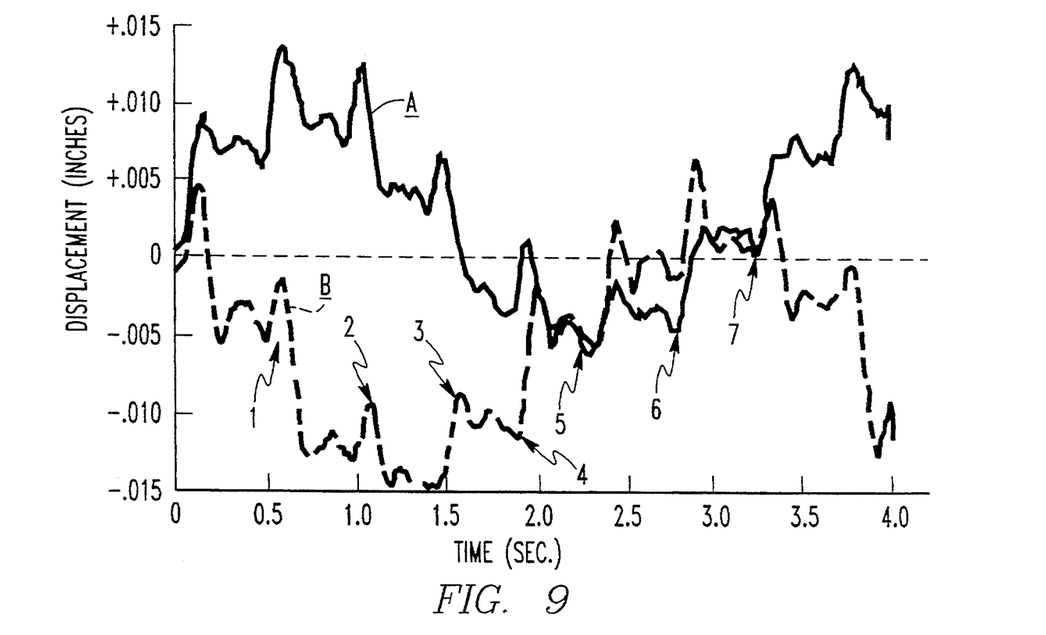
FIG. 9 is a graph showing displacement in the individual axes shown in FIG. 8, plotted against time.

FIG. 9 represents an alternative presentation of the data shown in FIG. 8, in this case with separate traces for the signals of the two transverse sensors 62 plotted against time. With each cycle, the displacement signal follows a peak and valley reflecting deflection of the workpiece upon release or engagement of the dies. Additionally, however, the signals follow a regular pattern of variation having a period substantially longer than the period of a cycle. The longer period is related to the extent of rotation of the workpiece. The workpiece is rotated at the beginning of each cycle, normally by an angle which is not a multiple of 360°, for example by 51°, thus producing a lower frequency variation having a period of about seven forming cycles. A low frequency variation which does not correspond to the number of cycles representing full rotation of the workpiece may indicate a problem with the rotational drive means applied to the workpiece.

Figure 10:
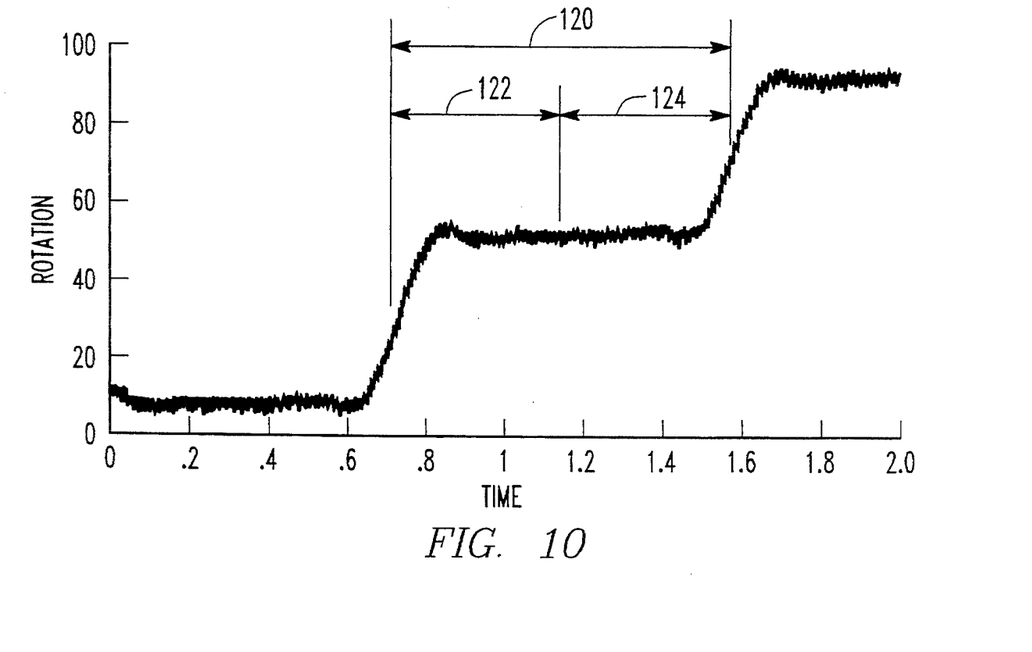
FIG. 10 is a graph showing rotational displacement over time, during a typical forming cycle.
Figure 11:
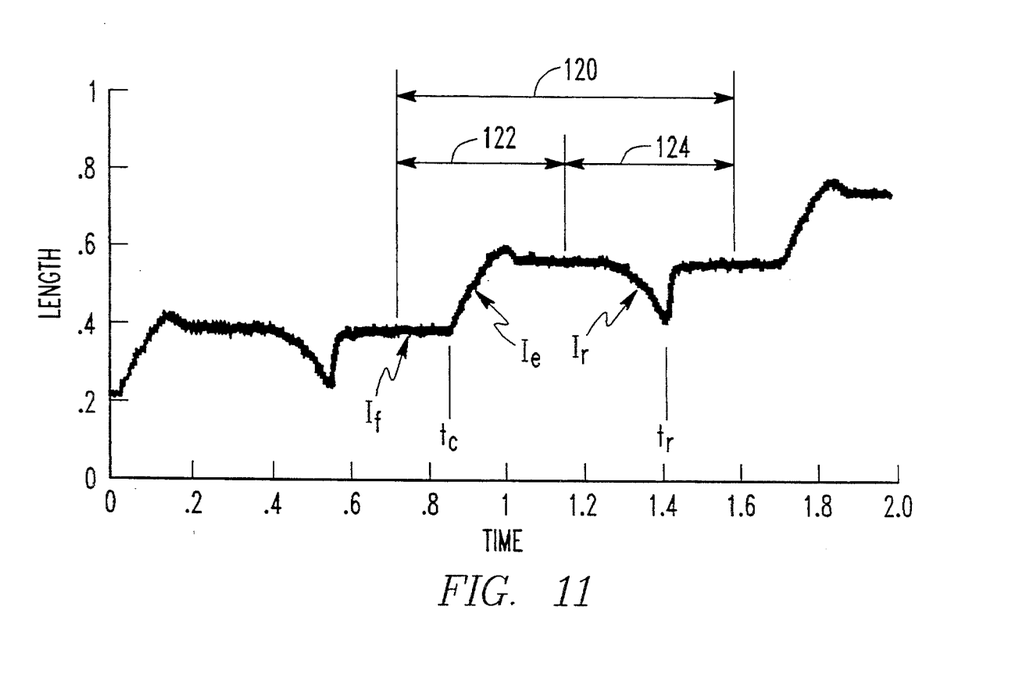
FIG. 11 is a graph of axial displacement taken at the same time as the rotational displacement illustrated in FIG. 10.

FIG. 10 is a graph showing rotational displacement over time, during a single forming cycle, and FIG. 11 is a graph of axial displacement over time during the same forming cycle. These figures show a typical variation in these parameters, with a complete cycle 120 shown subdivided into a work stroke 122 and a return stroke 124. The different phases of displacement are shown in the graph. An interval of axial feed $I_f$ is followed by an interval of elongation $I_e$ after die contact at time $t_c$. Preceding die release at $t_r$ there is an interval of retraction $I_r$ during which the workpiece moves axially backwardly against the mandrel. These graphs are exemplary and it will be appreciated that in different forming situations the specific variations may differ from those shown. In any event, by acquiring and plotting the sensor data as described, the invention provides a very helpful means for visualizing the process variations which are occurring, and for identifying promptly the occurrence of a problem.

Figure 12:
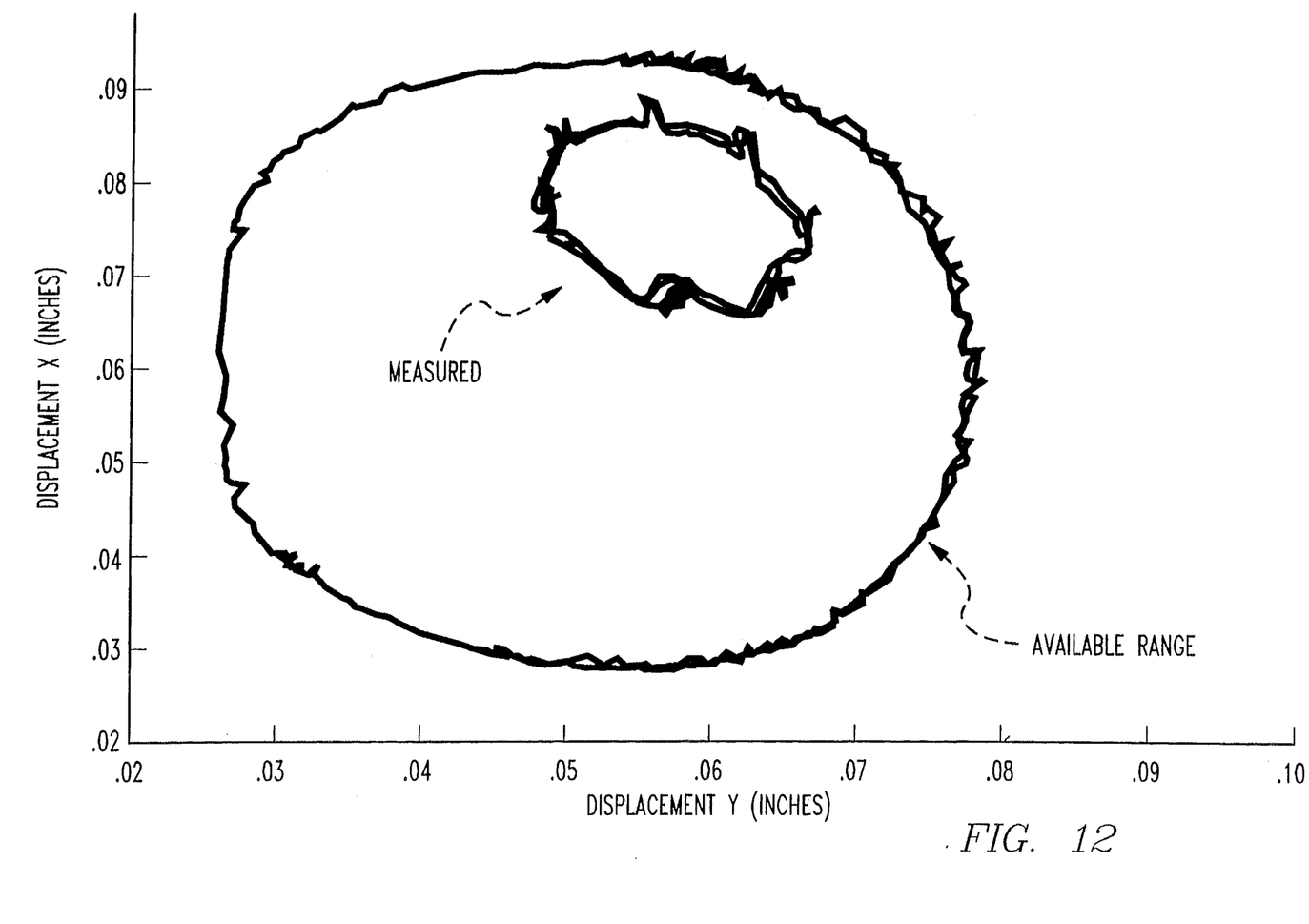
FIG. 12 is a graph of transverse displacement over a number of forming cycles, displayed with a graph of the maximum available measurement range within the tube supporting sleeve.

In FIG. 12, transverse-displacement over a number of forming cycles is illustrated by the smaller diameter oval. The larger diameter (circle) represents the maximum displacement available within the guide tube on which the sensors are mounted. The maximum displacement form can be generated from an empirical measurement, by manually moving a length of workpiece material around in the guide tube while sampling the measured displacement. Alternatively, the maximum can be estimated and displayed as an ideal circle. In either case, such a presentation of the displacement data is useful for showing clearly the extent of transverse displacement which is occurring during the pilgering process, and also the extent to which the circuit of actual workpiece displacement is centered relative to the guide tube.

The pilger apparatus can be instrumented for transverse displacement and motion sensing both before and after the forming zone, or only on one side. Where a comparable measurement (e.g., transverse displacement) is sensed and recorded simultaneously on both sides of the forming zone, a comparison of the data can reveal valuable alignment and operational information respecting the pilger apparatus.

The foregoing sensor examples are intended as illustrative rather than limiting. There are many types of sensors which could be used in lieu of the inductive displacement or proximity sensors and the variable differential transformers presently preferred as the sensing means, to develop data for analysis and display according to the invention.

The invention has been discussed in connection with preferred exemplary embodiments, and variations on the preferred embodiments will now become apparent to persons skilled in the art. Whereas the invention is intended to encompass the disclosed embodiments and a range of variations in accordance herewith, reference should be made to the appended claims and their reasonable equivalents in order to assess the scope of the invention in which exclusive rights are claimed.

We claim:

1. An apparatus for monitoring operation of a pilger forming apparatus having a mandrel for receiving a tubular workpiece, at least two opposed dies operable to bear against the workpiece, and means for rolling the dies over the workpiece to elongate and narrow the workpiece as the workpiece is advanced along an axis and rotated, comprising:
   sensing means directed at the workpiece, the sensing means producing a signal representing transverse displacement of the workpiece relative to the axis in a plane perpendicular to the axis, the sensing means including a sensor operable to measure rotation of the workpiece and a sensor operable to measure axial displacement of the workpiece; and,
   means for comparing a level of the signal to a nominal standard which is characteristic of a correct forming operation, operable to process the signal representing transverse displacement of the workpiece as a function of at least one of a rotation angle and an axial position of the workpiece;
   whereby divergence of the workpiece from the nominal standard indicates at least one of production of an unacceptable product and improper operation of the forming apparatus.

2. The apparatus according to claim 1, wherein the sensing means includes a plurality of sensors disposed axially before and after a point of application of the dies to the workpiece along an axis of elongation of the workpiece.

3. The apparatus according to claim 1, wherein the sensor operable to measure transverse displacement of the workpiece is disposed at least at one of points located axially before and after the point of application of the dies to the workpiece.

4. The apparatus according to claim 1, wherein the sensing means comprises at least two sensors disposed at right angles and operable to measure said transverse displacement of the workpiece in mutually perpendicular directions in the plane, the at least two sensors being disposed at least at one of points located axially before and after the point of application of the dies to the workpiece.

5. The apparatus according to claim 4, wherein the two sensors disposed at right angles comprise non-contacting proximity sensors mounted at least at one of points located before and after the point of application of the dies to the workpiece, the two sensors each providing a signal that varies as a function of distance between the workpiece and a respective one of the two sensors.

6. The apparatus according to claim 4, further comprising encoding means coupled to the sensors, the encoding means including at least one of an apparatus for recording variation of the signal over time, a comparator operable for comparing the signal to the nominal standard, and a display operable to illustrate variation in the signal over time.

7. The apparatus according to claim 4, further comprising encoding means coupled to the sensors, the encoding means including means for repetitively collecting the signal at least at one predetermined point in a repetitive machine cycle.

8. The apparatus according to claim 6, wherein the encoding means includes an analog to digital converter coupled to the signal and means for sampling the signal over time.

9. The apparatus according to claim 6, wherein the display includes at least one scale operable to illustrate displacement of the workpiece during successive rolling cycles on a given workpiece.

10. An apparatus for monitoring operation of a pilger forming apparatus having a mandrel for receiving a tubular workpiece, at least two opposed dies operable to bear against the workpiece, and means for rolling the dies over the workpiece to elongate and narrow the workpiece, comprising:
    sensing means directed at the workpiece, the sensing means producing a signal reflecting displacement of the workpiece in at least one of rotation, axial displacement and transverse displacement relative to an axis; and,
    means for comparing a level of the signal to a nominal standard which is characteristic of a correct forming operation;
    wherein the sensing means comprises sensors operable to measure rotation of the workpiece and axial displacement of the workpiece, in each case axially after a point of application of the dies to the workpiece along an axis of elongation of the workpiece, the sensing means comprising at least one rotary variable differential transformer having an idler wheel operable to bear against the workpiece.

11. The apparatus according to claim 10, comprising two rotary variable differential transformers having idler wheels disposed at right angles, operable to measure axial and rotational displacement of the workpiece at least at one of points located before and after the point of application of the dies to the workpiece.

12. The apparatus according to claim 11, further comprising means for cleaning the workpiece of lubricant disposed axially before the idler wheels and after the point of application of the dies to the workpiece.

13. A forming apparatus comprising:
    a mandrel for supporting from inside a tubular workpiece to be elongated and thinned;
    at least two opposed dies operable to bear against an outside of the workpiece;

drive means for rolling the dies over the workpiece under pressure while periodically rotating and advancing the workpiece along an axis of the mandrel;

sensing means directed at the workpiece, the sensing means producing signals representing transverse displacement of the workpiece in a plane perpendicular to the axis, said signals indicating a position of the workpiece relative to the axis at an axial position of the sensing means, the sensing means including a sensor operable to measure rotation of the workpiece and a sensor operable to measure axial displacement of the workpiece;

a data acquisition system operable to acquire data representing a level of the signals at least at one point in a succession of forming cycles; and at least one of a display and a plotter, coupled to the data acquisition system and operable to produce a visual output reflecting the level of the signals over said forming cycles, whereby operation of the forming apparatus readily can be assessed, the visual output indicating transverse displacement of the workpiece as a function of at least one of a rotation angle and an axial position of the workpiece.

14. The apparatus according to claim 13, wherein data acquisition system and said at least one of the display and the plotter are operable to produce the visual output respecting a forming operation in progress.

15. The apparatus according to claim 13, wherein the sensing means includes a plurality of sensors disposed at least at one of points located axially before and after a point of application of the dies to the workpiece along an axis of elongation of the workpiece.

16. The apparatus according to claim 15, wherein at least one of said sensors is disposed after the point of application of the dies to the workpiece, and further comprising means for cleaning the workpiece of lubricant disposed axially before said at least one of said sensors and axially after the point of application of the dies to the workpiece.

17. The apparatus according to claim 13, wherein sensors operable to measure rotation of the workpiece and axial displacement of the workpiece are placed axially after a point of application of the dies to the workpiece along an axis of elongation of the workpiece, and sensors operable to measure transverse displacement of the workpiece are placed axially before the point of application of the dies to the workpiece.

18. The apparatus according to claim 17, wherein the sensors operable to measure transverse displacement comprise two sensors disposed at right angles, the two sensors being operable to measure transverse displacement of the workpiece in mutually perpendicular directions.

19. The apparatus according to claim 13, wherein said at least one of the display and the plotter is operable simultaneously to display a maximum sensor range, thereby showing variation of the signals compared to the maximum sensor range.

20. A forming apparatus comprising:

a mandrel for supporting from inside a tubular workpiece to be elongated and thinned while advanced along an axis;

at least two opposed dies operable to bear against an outside of the workpiece;

drive means for rolling the dies over the workpiece under pressure while periodically rotating and advancing the workpiece along the axis and over the mandrel;

sensing means directed at the workpiece, the sensing means producing signals reflecting displacement of the workpiece in a direction transverse to the axis in a plane perpendicular to the axis, the sensing means comprising two sensors at right angles operable to measure transverse displacement of the workpiece in mutually perpendicular directions, and sensors operable to measure rotation of the workpiece and axial displacement of the workpiece, the sensors operable to measure rotation of the workpiece and axial displacement of the workpiece being placed axially after a point of application of the dies to the workpiece along the axis and the sensors operable to measure transverse displacement of the workpiece being placed axially before the point of application of the dies to the workpiece along the axis, said sensors operable to measure rotation and axial displacement comprising rotary variable differential transformers coupled to idler wheels operable to bear against the workpiece in mutually perpendicular directions after a point of application of the dies to the workpiece;

a data acquisition system operable to acquire data representing a level of the signals at least at one point in a succession of forming cycles; and at least one of a display and a plotter, coupled to the data acquisition system and operable to produce a visual output reflecting the level of the signals over said forming cycles.

* * * * *